Oct. 14, 1952 R. A. PROUD ET AL 2,613,835
MACHINE FOR ATTACHING SNAP FASTENERS TO TAPE AND THE LIKE
Filed July 27, 1949 2 SHEETS—SHEET 1
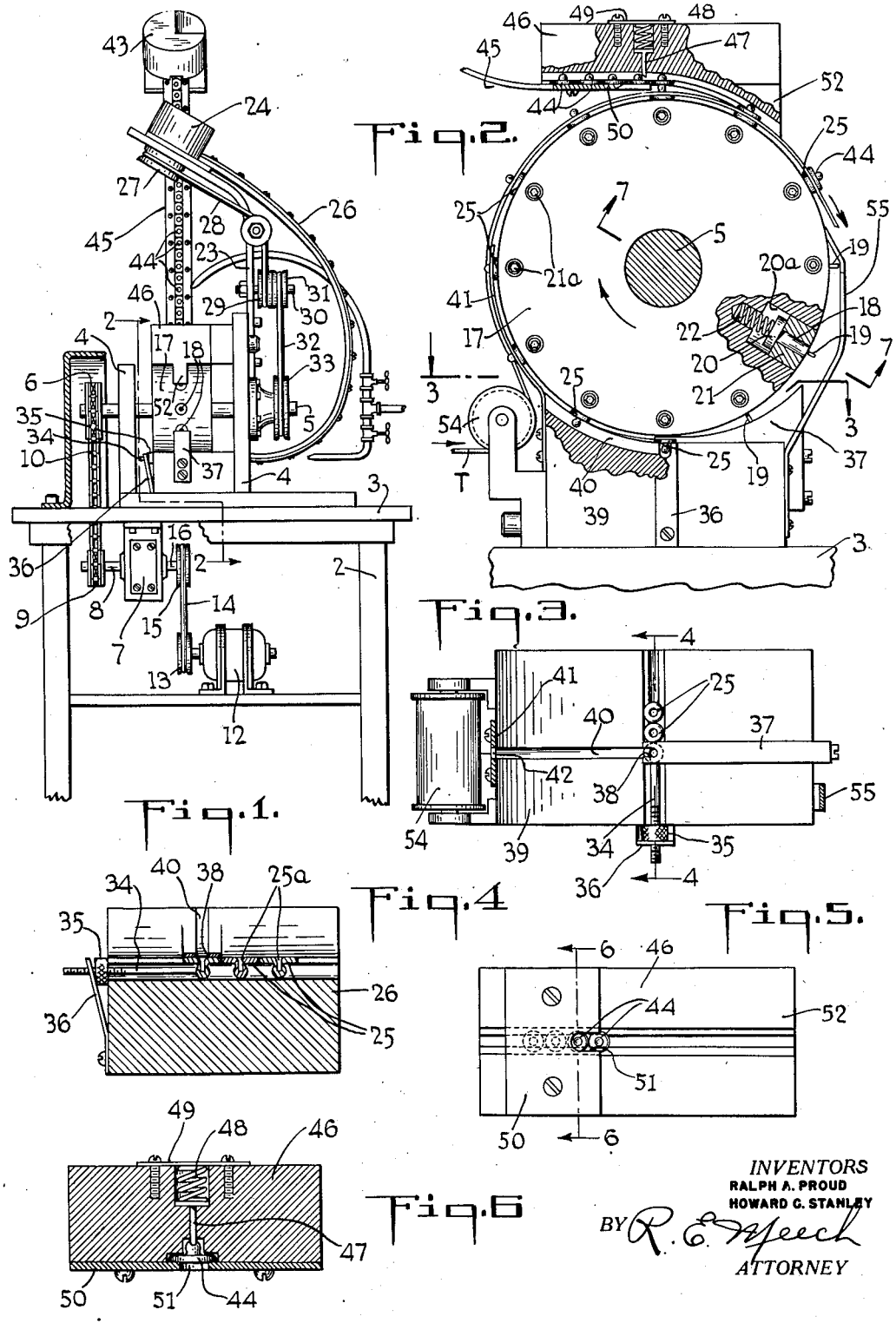
INVENTORS
RALPH A. PROUD
HOWARD G. STANLEY
BY R. E. Meech
ATTORNEY

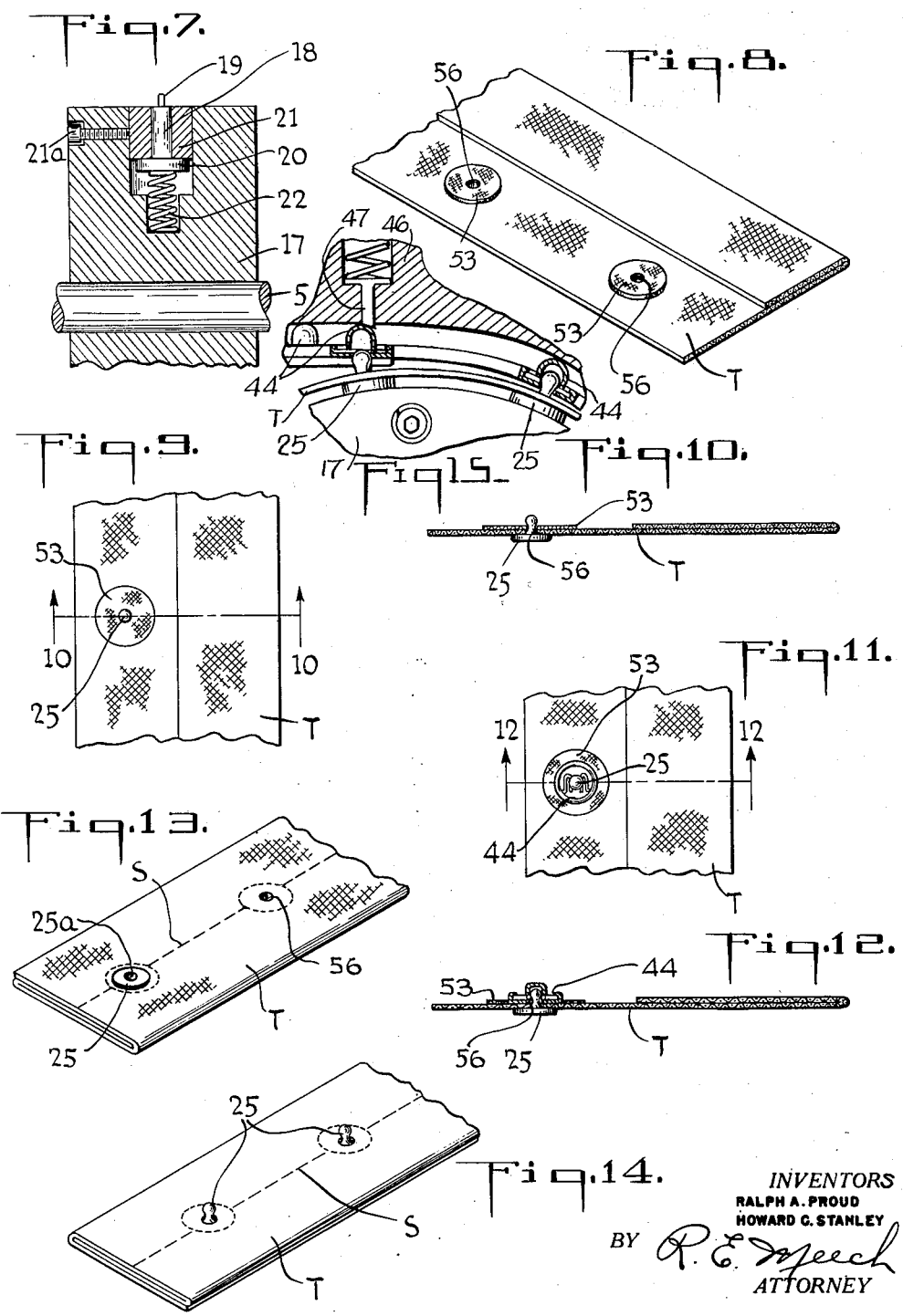

Patented Oct. 14, 1952

2,613,835

UNITED STATES PATENT OFFICE 2,613,835

MACHINE FOR ATTACHING SNAP FASTENERS TO TAPE AND THE LIKE

Ralph A. Proud, Wickliffe, and Howard C. Stanley, Willoughby, Ohio, assignors to Talon, Inc., a corporation of Pennsylvania Application July 27, 1949, Serial No. 106,994

4 Claims. (Cl. 218—18)

This invention relates to a machine for attaching snap fasteners to a tape or other flexible carrier.

Snap fastener tape is adapted for various purposes, for example, as a closure for clothing, slip covers, etc. One tape is made so that the stud fastener elements carried by it may coact with socket fastener elements carried by another tape. The studs and socket elements are so positioned on the respective tapes, usually equidistant apart, so that the socket members on the one tape register with the stud members on the other.

In one type of construction, the fastener element, whether stud or socket, is placed between two plies of fabric in registration with an opening through one of the plies. The stud elements extend through openings in the tape and the socket elements are aligned with the openings in the tape to which they are attached. In either case, the fastener element is retained securely in position in the respective tape by means of stitching which passes through the plies of fabric and around the fastener elements.

In the manufacture of such tape it is customary to attach or affix temporarily the fastener elements, both stud and socket, to the tapes before they are delivered to the sewing machine where the tape is folded as it enters the machine and the plies of fabric stitched together between and around the fastener elements. It is to a machine for attaching the fastener elements to the tape temporarily before the tape is folded and stitched that the present invention relates.

Accordingly, it is the general object of the present invention to provide a machine which will attach automatically both the stud and socket fastener elements of snap fasteners to a tape or other carrier.

It is another object of the invention to provide a machine which may be used selectively to attach either the stud or socket elements to the tape.

It is a more specific object of the invention to provide a machine wherein both the stud and socket elements are fed automatically to a rotatable member and picked up automatically thereby and attached to the tape.

It is a further object of the present invention to provide a machine which will deliver automatically stud elements to a rotatable member at one point which in turn delivers and attaches them to one side of a tape, and delivers socket elements to the rotatable member at another point and on the opposite side of the tape whereby the socket members are clamped to the stud members extending therethrough.

It is still another object of this invention to provide a machine for attaching stud and socket elements to a tape or other carrier which is simple and inexpensive in its manufacture and operation and, at the same time, efficient and effective in its use.

Various other objects and advantages of this invention will be more apparent in the course of the following specification, and will be particularly pointed out in the appended claims.

In the accompanying drawings, there is shown for the purpose of illustration, an embodiment which our invention may assume in practice.

In these drawings:

Fig. 1 is an elevational view of our improved machine;

Fig. 2 is an enlarged sectional view taken on line 2—2 of Fig. 1;

Fig. 3 is a sectional view taken on line 3—3 of Fig. 2;

Fig. 4 is a sectional view taken on line 4—4 of Fig. 3;

Fig. 5 is a bottom view of the guide and cam member for the socket elements, as shown at the top of Fig. 2;

Fig. 6 is a sectional view taken on line 6—6 of Fig. 5;

Fig. 7 is a sectional view taken on line 7—7 of Fig. 2;

Fig. 8 is a perspective view of the bottom side of a piece of tape showing the stud elements attached thereto by means of our machine;

Fig. 9 is a plan view of the top side of the tape as shown in Fig. 8;

Fig. 10 is a sectional view taken on line 10—10 of Fig. 9;

Fig. 11 is a plan view of the top side of a tape showing a socket element attached thereto;

Fig. 12 is a sectional view taken on line 12—12 of Fig. 11;

Fig. 13 is a perspective view of the inner side of a finished tape having socket elements attached thereto after it has been folded and sewn;

Fig. 14 is a similar view of the inner side of a finished tape having stud elements attached thereto after it has been folded and sewn; and Fig. 15 is an enlarged fragmentary side view of the upper portion of the rotatable member, as shown in Fig. 2, showing the stud elements registering with the socket members at the point of delivery to said rotatable member upon rotation thereof.

Referring more particularly to Figs. 1 through 7 of the drawings, our improved machine consists of a table-like base 2 having a top 3 on which there is mounted a pair of spaced-apart brackets 4. There is journalled in the brackets 4, a rotatable shaft 5 on one end of which there is secured a sprocket 6.

On the under side of the top 3, there is mounted a gear reducer 7 having a shaft 8 extending out from one side thereof on which there is secured a sprocket 9. There is provided a chain 10 which is disposed over and around the sprockets 6 and 9. Below the top 3, there is suitably arranged an electric motor 12 having a pulley 13 arranged on the shaft thereof. There is provided a belt 14 which is disposed over and around the pulley 13 and a pulley 15 secured to a shaft 16 extending outwardly from the reducer 7. By such arrangement, it will be seen that the shaft 5 is driven by the electric motor 12 through the action of the belt 14, the gear reducer 7, and the chain 10.

There is secured to the shaft 5 intermediate the length thereof and positioned between the brackets 4, a cylindrical drum-like rotatable member 17 to the periphery of which the stud and socket elements are fed by mechanism and in a manner hereinafter to be described. Around the periphery of the member 17, there is arranged a plurality of spaced-apart plunger-like pin members 18 each having a reduced outer end portion 19 and an enlarged inner end portion 20. These plunger-like members 18 are disposed in radially extending apertures 20a arranged in the periphery of the member 17 and are held therein by apertured plug-like members 21 and set screws 21a. There is arranged rearwardly of each of the plunger-like members 18, a compression coil spring 22 which is adapted to maintain normally the plunger-like members in their protracted position so that the reduced outer end portions 19 thereof protrude outwardly from the periphery of the member 17, as shown in Fig. 2. The enlarged inner end portion 20 of each of the pins 18 abuts the inner end of the plug 21 so as to limit its outward movement and to position the same. It will be understood that the plunger-like members 18 are spaced a distance apart equal to the distance it is desired that the fastener elements be spaced apart on the finished snap fastener tape.

On one of the brackets 4, there is mounted an upwardly extending bracket 23 on the upper end of which there is positioned a hopper 24 in which the stud elements 25 are disposed en masse. There is connected to this hopper 24, a chute 26 down which the stud elements pass as they are selectively delivered thereto from the hopper. The stud elements are agitated in the hopper in a conventional manner with the agitator (not shown) driven by a pulley and belt 27 and 28, respectively. The belt 28 is disposed over a pulley 29 which is secured to a stud shaft 30 carried by the bracket 23. There is also provided another pulley 31 on the shaft 30 over which another belt 32 is disposed. The belt 32 is also disposed over and around still another pulley 33 secured to the drive shaft 5. That is to say, the agitator of the hopper 24 is driven by the shaft 5 through the action of the belts 28 and 32.

The lower end of the chute 26 terminates on the under side of the rotatable member 17 adjacent the periphery of the member 17, as more clearly shown in Figs. 3 and 4. At the end of the chute, there is arranged a stop in the form of a rod 34, one end of which extends into the chute so that the lowermost stud element 25 therein abuts the end of the rod so as to position it in alignment with the row of pins 18 in the periphery of the member 17. On the outer end of the rod 34, there is arranged an adjustable nut 35 for adjusting the position of the rod. There is provided a spring bracket 36 which abuts against the adjustable nut 35 so as to maintain the rod in its adjusted position in the end of the chute.

Below the rotatable member 17, as more clearly shown in Figs. 2 and 3, there is arranged a shoe-like camming and guide member 37 which is positioned forwardly of the chute to one side thereof with the lower end terminating adjacent the end of the rod 34 at the point of delivery of the stud elements 25 to the periphery of the member 17. It is the purpose of this camming member 37 to force the pins 18 inwardly to their retracted position against the action of the springs 22 when the member 17 rotates and successively brings them in contact therewith. The lowermost end of the camming member 37 is forked, as at 38, so as to permit the reduced end portions 19 of the pins 18 to pass into the forked portions in engagement with the hole in the stud elements 25 as the pins pass out of contact with the camming member.

There is positioned forwardly of the camming member 37, another guide member 39 having a groove 40 therein for holding and guiding the stud elements as they pass therealong to engagement with another plate-like guide member 41 extending partially around the periphery of the rotatable member 17 and which is slotted longitudinally and centrally thereof so as to permit the stud elements 25 to protrude therethrough as they pass therealong.

There is positioned above the top 3 and the rotatable member 17, another hopper 43 in which the socket or spring elements 44 are placed en masse. There is connected to this hopper, a chute 45 down which the socket elements pass to a point above the rotatable member 17 adjacent the periphery thereof, as clearly shown in Fig. 2 of the drawings. The socket elements 44 are agitated in the hopper 43 and selectively delivered to the chute 45 in any suitable manner.

At the lower end of the chute 45 adjacent the periphery of the rotatable member 17, there is arranged an extension 46 of the chute 45 having a stop arranged therewith in the form of a pin-like plunger 47 with its outer end extending into the passage-way of the chute so as to prevent the lowermost socket element 44 therein from being accidentally displaced therefrom. The plunger stop 47 is maintained in its protracted position, as shown in Figs. 2 and 6, by means of a compression coil spring 48 which is backed by a plate 49 attached to the outer side of the extension 46. There is provided a plate 50 on the bottom side of the extension 46 which is recessed at the outer edge thereof, as at 51, so as to permit the stud elements 25 to pass into engagement with the socket elements 44, as will be explained. The outer end of the extension 46 terminates in a shoe-like camming and guide portion 52 which extends partially around the periphery of the member 17, and is provided for a purpose hereinafter to be described.

The machine of the present invention operates in the following manner. The tape T is fed into the machine from any suitable source of supply. Such tape has a row of spaced-apart holes 56 arranged therein which are spaced apart the distance it is desired to have the fastener elements spaced apart on the finished tape. Usually there is provided a circular piece of material 53 arranged around each of the holes so as to provide an extra thickness of material for the purpose of reinforcing the tape at these points. The holes 56 in the tape are slightly smaller than the stud portion of the stud element so that when the stud portion is forced therethrough it will not readily be displaced therefrom, whereby the studs when forced therethrough are temporarily attached to the tape until they are more securely attached thereto later by sewing therearound, as has been heretofore explained. Also, the tape has been folded previously in a manner shown in Fig. 8.

As the tape is fed into the machine, it passes around a guide member 54 which may be a roller, but it has been found that a stationary guide bar is more satisfactory. It then passes up along the outer side of the guide member 41, and as it passes therealong, the stud portions of the stud elements 25 are forced into and through the holes 56 in the tape. It will be understood that a series of studs 25 previously have been disposed on the plunger pins 18. As has been explained briefly, the studs 25 pass from the hopper 24 down the chute 26, and as the pins 18 carried by the rotatable member 17 pass the point of delivery of the studs to the periphery of the member 17, they are picked up successively by the pins from the end of the chute with the reduced outer end portion 19 of the pins passing into a hole 25a in the studs which results from the formation thereof. The studs are then carried along the guide 39 due to the rotation of the member 17 with the stud portions disposed in the groove 40 thereof until they are forced into and through the holes 56 in the tape T as previously explained. As the rotatable member 17 is rotated in a clockwise direction by the motor 12 and the shaft 5 to which it is secured, the tape is pulled from its source of supply around the guide member 54 due to the engagement of the tape with the stud elements 25 disposed on the plungers 18 arranged around the periphery of the rotatable member 17.

When the stud elements 25 approach the top of the rotatable member 17, as shown in Fig. 15, they engage successively the lowermost socket element 44 in the chute extension 46 and move it therefrom against the action of the spring plunger 47. As the rotatable member continues in its travel, the socket elements are forced into snapping engagement with the studs 25 by the shoe-like camming portion 52. This completes the assembly of the stud and socket elements on the tape, and the tape is stripped from the rotatable drum and delivered from the machine by means of a stripping member 55 which contacts the outer periphery of the rotatable member 17 so as to force the studs out of engagement with the plungers 18 by a camming action.

It will be understood that our machine, as above described, may be used for applying only stud elements to the tape, as well as socket or spring elements. If it is desired to use the machine to attach only stud elements to a tape, the hopper 43 and chute 45 are not used and the chute 45 may be suitably blocked at the lower end thereof so as to prevent the delivery of the socket members 44 to the periphery of the rotatable member. In such event, the stud elements 25 are forced through the holes 56 in the tape as previously described, but socket elements are not delivered or attached thereto. In such case, the studs are held in the holes of the tape due to the tight fit therewith and a tape is produced, as shown in Figs. 9 and 10. The tape is then folded as shown in Fig. 14 and stitched, as at S, by a sewing machine in another operation.

It will be seen that when socket elements 44 are attached to the tape, they are assembled thereon as initially described so as to produce a tape as shown in Figs. 11 and 12. The tape is then folded and stitched, as at S, by a sewing machine so as to anchor securely the socket elements therein. It will be understood that in such case, the stud elements are employed merely to hold the socket elements in place until the sewing operation has been completed. The studs are then removed and re-used so as to provide a socket tape, as shown in Fig. 13, wherein there is shown one stud member still engaged with a socket member, but which will be removed before the tape is sold and put to use.

As a result of our invention, it will be seen that we have provided a simple and inexpensive machine for attaching stud and socket elements to snap fastener tape which consists of a minimum number of parts and which can be easily maintained and operated. Also, it will be seen that the machine of the present invention is universal in its use in that it can be used to attach either the socket or stud elements, or both, to the tape.

While we have shown and described an embodiment which our invention may assume in practice, it will be understood that this embodiment is merely for the purpose of illustration and description, and that other forms may be devised within the scope of our invention as defined in the appended claims.

What we claim as our invention is:

1. In a machine for attaching snap fasteners to a flexible carrier, a rotatable member, a plurality of spaced-apart plunger-like radially extending pin members arranged around the periphery of said rotatable member which are maintained normally in a protracted position so as to extend outwardly from the periphery of said rotatable member by means of a compression spring arranged in said rotatable member rearwardly of each of said pin members, means for delivering stud elements to the periphery of said rotatable member, means for aligning the stud elements in the line of travel of said pin members as they pass the point of delivery of the stud elements to said rotatable member whereby the pin members are adapted to extend into said stud elements, means for holding said elements on said pin members after they pass the point of delivery, means for delivering a flexible carrier to and around the periphery of said rotatable member whereby the stud elements, being positioned on said pin members at spaced-apart points around the periphery of said rotatable member, may protrude through spaced-apart holes in said flexible carrier, means for delivering socket fastener elements to a point adjacent the periphery of said rotatable member, said stud elements carried by said rotatable member being adapted to register successively with the socket elements at the point of delivery thereof and to move them from said delivery means as said rotatable member is rotated, and stationary means arranged opposite the periphery of said rotatable member adjacent the point of delivery of said socket elements and in the path of rotation thereof for moving and forcing the socket elements into engagement with the stud elements protruding through the flexible carrier arranged therebetween.

2. In a machine, as defined in claim 1, which includes a stationary shoe-like cam member arranged opposite the periphery of the rotatable member adjacent the point of delivery of said stud elements thereto, said cam member being adapted to force the pin members inwardly against the action of the springs to a retracted position in the rotatable member when the outer ends of the pins come into contact with said cam member, said pin members being adapted to be moved by said springs to their protracted position and into engagement successively with the stud elements at the point of delivery of said stud elements when the ends of the pin members move successively out of contact with said cam member as the rotatable member rotates.

3. In a machine, as defined in claim 2, wherein the shoe-like cam member terminates in a forked end portion at the point of delivery of said stud elements to the periphery of the rotatable member, said stud elements being adapted to be positioned opposite said forked portion by said delivery means and said pin members being adapted to extend into said forked portion when they pass out of contact with the cam surface of said cam member and into engagement with the stud elements as the rotatable member rotates.

4. In a machine, as defined in claim 1, wherein the means for moving and forcing the socket elements successively into engagement with the stud elements includes a shoe-like cam member which forces the socket elements successively into engagement with the stud elements carried by the flexible member upon rotation of said rotatable member and the movement thereby of the socket elements along said shoe-like member.

RALPH A. PROUD.
HOWARD C. STANLEY.

REFERENCES CITED

The following references are of record in the file of this patent:

UNITED STATES PATENTS

| Number | Name | Date |
| --- | --- | --- |
| 1,135,576 | Grabau | Apr. 13, 1915 |
| 1,400,002 | Roger | Dec. 13, 1921 |
| 1,407,576 | Prym | Feb. 12, 1922 |